United States Patent [19]

Paukune

[11] 4,199,175
[45] Apr. 22, 1980

[54] RIBBED FLANGE MODIFIED SEAL

[75] Inventor: Arthur J. Paukune, Hobe Sound, Fla.

[73] Assignee: The United States of America as represented by the Secretary of the Air Force, Washington, D.C.

[21] Appl. No.: 900,950

[22] Filed: Apr. 28, 1978

[51] Int. Cl.² ............................................. F16L 23/00
[52] U.S. Cl. .................... 285/405; 285/412; 285/330
[58] Field of Search ............... 285/363, 368, 405, 412, 285/330; 277/193

[56] References Cited

U.S. PATENT DOCUMENTS

| | | | |
|---|---|---|---|
| 790,767 | 5/1905 | Walsh | 285/368 |
| 1,993,927 | 3/1935 | Gavin | 285/368 |
| 2,108,151 | 2/1938 | Teetor | 285/368 |
| 2,328,031 | 8/1943 | Risley | 285/368 |
| 3,336,055 | 8/1967 | Pall | 285/368 |

*Primary Examiner*—Robert I. Smith
*Attorney, Agent, or Firm*—Joseph E. Rusz; Arsen Tashjian

[57] ABSTRACT

The cylindrical sections of a gas turbine engine are provided with flanges at each end for bolting the sections to one another. Each flange includes a series of strengthening ribs of arcuate configuration extending axially outward from the center of the wall thereof between the several bolts needed to join the adjacent sections together. The ribs serve to eliminate the need for at least 2 out of 3 bolts while effectively maintaining the required stiffness and sealing capability.

2 Claims, 3 Drawing Figures

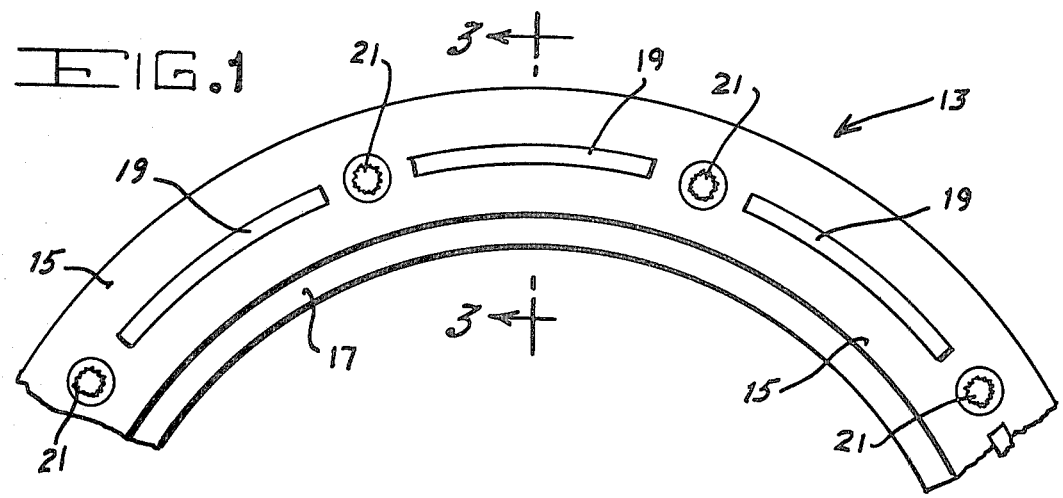
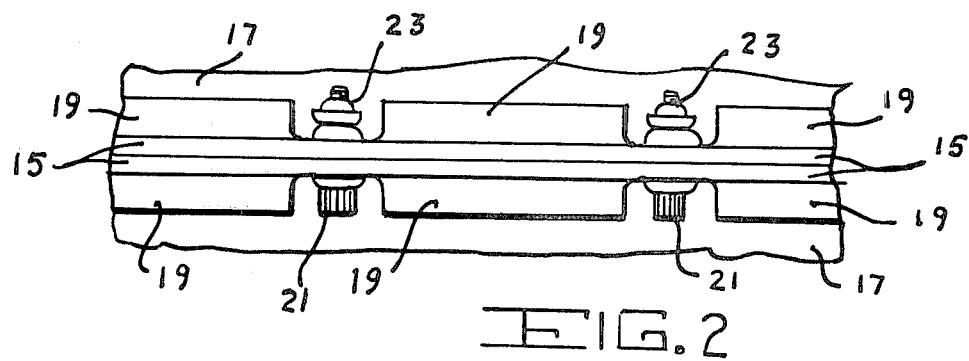
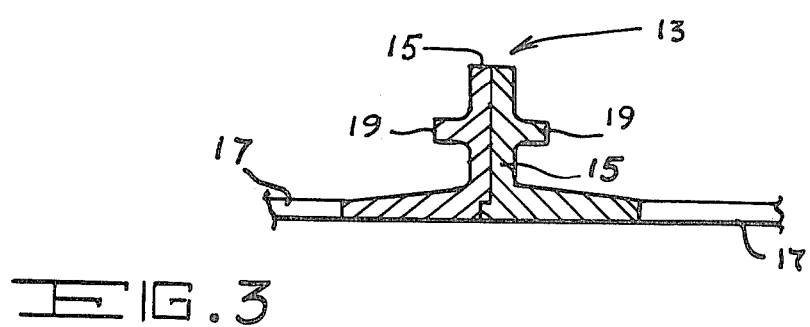

RIBBED FLANGE MODIFIED SEAL

STATEMENT OF GOVERNMENT INTEREST

The invention described herein may be manufactured and used by or for the Government for governmental purposes without the payment of any royalty thereon.

BACKGROUND OF THE INVENTION

This invention relates to a ribbed flange seal for a gas turbine engine and, more particularly, the invention is concerned with providing strengthening ribs of arcuate configuration extending outwardly from the walls of adjacent flanges so that fewer bolts are needed to join the sections while effectively maintaining a positive seal between the sections.

Heretofore, it has been common practice to attach the several sections of large turbojet and turboshaft engines to each other by bolting the flanged sections to one another. A large number of closely spaced bolts are required in order to maintain a tight dependable seal between the sections. Each of the bolts must be provided with a nut and each must be lockwired to prevent loosening. Since the flange on each section is generally quite thin to save weight, the bolts are spaced in a typical engine at 4 times the bolt diameter requiring as many as 210 bolts per flange to provide the necessary seal. It can be seen that the assembly procedure can be very time consuming as well as costly in terms of the bolts, nuts and lockwiring involved. Also, the time required to drill and counterbore the many holes for the nuts and bolts can add greatly to the cost of assembling the engine.

It would be desirable to provide a sealing arrangement between the sections of the engine whereby assembly could be accomplished with a minimum number of bolts, nuts and lockwires and where the flange still serve to maintain a tight seal between sections. Also, the strength and rigidity of the flange must be sufficient while the weight of the completely assembled engine must be held within tolerable limits. The hereinafter described modified flange sealing arrangement does provide a suitable seal without adding weight and, at the same time, reducing the cost of hardware required for assembly.

SUMMARY OF THE INVENTION

The present invention is concerned with providing ribbed flange sealing arrangement wherein the flanged sections of a gas turbine engine are joined to one another with a minimum number of bolts and nuts. A series of strengthening ribs of arcuate configuration are positioned on the center of the wall of each flange and extend outwardly therefrom. A bolt and nut is positioned between the ends of the arcuate ribs to hold the flanges on adjacent sections together. The rib operates to make the flange more rigid and stronger so that fewer bolts are needed.

Accordingly, it is an object of the invention to provide a flange sealing arrangement wherein two out of three bolts-nuts and lockwires are eliminated thereby saving considerable time in assembly and disassembly of the turbine engine.

Another object of the invention is to provide a flange sealing arrangement wherein a center rib is included on each flange for strengthening the flange and making the seal more effective with fewer bolts and nuts.

Still another object of the invention is to provide a flange sealing arrangement having a center rib extending outwardly from the center of the flange wall allowing the tolerances on the rib and flange walls to be relaxed.

A further object of the invention is to provide a flange sealing arrangement wherein the cost of machining the holes for the bolts and nuts can be substantially reduced since fewer holes are required when the strengthening rib is positioned on the walls of the adjacent flanges.

A still further object of the invention is to provide a flange sealing arrangement for a gas turbine engine wherein a series of arcuate ribs extend outwardly from adjacent flanges between bolts thereby producing overall weight savings by eliminating most of the bolts, nuts and lockwires which are usually required.

These and other objects, features and advantages will become more apparent after considering the following detailed description taken in conjunction with the annexed drawings and appended clams.

BRIEF DESCRIPTION OF THE DRAWINGS

FIG. 1 is a side view of a flange sealing arrangement according to the invention showing the outwardly extending arcuate ribs with the bolts therebetween;

FIG. 2 is a top view of the ribbed flange seal showing the bolts and nuts used to attach adjacent flanges to each other; and FIG. 3 is a cross-sectional view taken along the line 3—3 of FIG. 1 showing two adjacent ribbed flanges juxtaposed in assembled condition.

DESCRIPTION OF A PREFERRED EMBODIMENT

Referring now to the drawings in which like reference numerals refer to like elements in each of the views, FIG. 1 shows a plan view of a portion of a flange 13 which is used at each end of the sections, such as the nozzle, of a turbojet engine to form part of a seal to prevent leakage between the sections. The flange 13 includes a wall portion 15 which extends radially outward from the cylindrical engine section 17. A series of arcuate ribs 19 extend axially outward from the walls 15 of the flange 13. The bolts 21 are located through drilled holes in the flange 13 between the ends of the arcuate ribs 19. A corresponding nut 23 is threadably attached to each bolt 21 for holding the two adjacent flanges 13 (see FIG. 2 together.

In FIG. 3, there is shown a cross section of the ribbed flange 13 taken along the line 3—3 of FIG. 1. The tibs 19 of the adjacent flanges 13 extend axially outward from the walls 15 while the flange 13 extends radially outward from the cylindrical engine section 17. In a typical utilization of the invention with a turbojet engine, two out of three bolts can be eliminated by positioning the arcuate ribs 19 on the flange 13. Instead of requiring 210 bolts on the rear fan duct case or one bolt every 4 diameters on the flange, only 70 bolts are necessary. Thus it can be seen that considerable time and effort can be saved as well as the cost of hardware and machining holes for bolts 21 can be reduced. Also, a weight saving is possible by greatly reducing the number of bolts 21 without sacrificing overall rigidity and-/or strength.

Although the invention has been illustrated in the accompanying drawings and described in the foregoing specification in terms of a preferred embodiment thereof, the invention is not limited to this embodiment or to the particular configuration shown. It will be apparent to those skilled in the art that certain obvious changes, modifications and substitutions can be made, particularly with respect to the shape and positioning of the arcuate ribs without departing from the true spirit and scope of the appended claims. Also, it should be noted that the invention can be useful for joining any flanged elements to one another where it is necessary to provide a positive seal.

Having thus set forth the nature of my invention, what I claim and desire to secure by Letters Patent of the United States is:

1. In a gas turbine engine having at least two cylindrical adjacent flanged sections, a modified ribbed flange seal comprising a one-piece circular flange fixedly attached to each end of each flanged section, the front joining surface and the back surface of each of said flanges being of substantially flat configuration, a plurality of arcuate ribs with spaces between the ends thereof extending axially outward from the center of the back surface of each flange, and fastening means positioned in the spaces between the ends of said arcuate ribs on the flange for holding the adjacent flanged sections together thereby providing a tight seal therebetween with fewer fastening elements.

2. The modified ribbed flange defined in claim 1 wherein said fastening means includes a series of threaded bolts in a corresponding series of aligned holes through the adjacent flanged sections in the spaces between the ends of said arcuate ribs and nuts on the threaded ends of said bolts.

* * * * *